United States Patent

Stradella et al.

[15] 3,707,089
[45] Dec. 26, 1972

[54] CONSTANT RATIO CALIBRATION AND TRANSMISSION DEVICE FOR MOVEMENTS OF BOURDON TYPE PRESSURE GAGES AND THE LIKE

[72] Inventors: Giuseppe Stradella; Umberto Stradella, both of Via Roma 13; Giuliano Daniele, Via Roma 144D; Fernando Gatti, Via Cavour 37, all of Recco, Italy

[22] Filed: Dec. 3, 1970

[21] Appl. No.: 94,932

[30] Foreign Application Priority Data

Dec. 6, 1970 Italy.................................7497 A/70

[52] U.S. Cl.......................................73/418, 73/411
[51] Int. Cl................................................G01l 7/04
[58] Field of Search........73/411, 412, 413, 414, 415, 73/416, 417, 418, 368.6; 74/230.18; 242/72, 72.1

[56] References Cited

UNITED STATES PATENTS 454,615  6/1891  Hardie.................................242/72.1

FOREIGN PATENTS OR APPLICATIONS 8,759  4/1909  Great Britain.........................73/414

*Primary Examiner*—Donald O. Woodiel
*Attorney*—Sparrow & Sparrow

[57] ABSTRACT

A calibration and transmission device for the construction of high-precision movements for Bourdon type pressure gages and the like, comprising a variable-diameter and constantly centered pulley means working together with a flexible and constant-length transmission chain or cable acting as a connection means to the indicating device of the instrument.

5 Claims, 2 Drawing Figures

PATENTED DEC 26 1972 3,707,089

INVETORS.
GIUSEPPE STRADELLA
UMBERTO STRADELLA
GIULIANO DANIELE
FERNANDO GATTI

BY SPARROW AND SPARROW
ATTORNEYS

CONSTANT RATIO CALIBRATION AND TRANSMISSION DEVICE FOR MOVEMENTS OF BOURDON TYPE PRESSURE GAGES AND THE LIKE

BACKGROUND OF THE INVENTION

In the field of technical instruments, the gage for measuring the pressure of fluids is one of the most widespread and useful means. Usually, pressure gages used presently comprise a Bourdon spring tube, i.e. a metal tube of elliptical cross section wherein a pressurized fluid acts, the closed end of which is connected to a movable pointer for indicating the pressure as a function of the curvature variation of said metal tube. When the indication must have a certain degree of precision, the connection between the end of the metal tube and the indicating device of a gage usually comprises a link member pivotably connected to said device through a pivot the position of which can be selectively changed and locked. This solves the problem of calibration, but not the serious drawback of the variation of transmission ratio as a function of the various operating angles of the connecting link along the arcuate path of movement of the spring tube during the deformation thereof. Virtually, in order to construct a pressure gage of absolute precision, the latter should be provided with a graduated dial corrected in accordance with said variations of transmission ratio between the closed end of the spring tube and the indicator device or movement. Obviously, such a solution cannot be used for mass-production of precision gages, also because the calibration system heretofore used is a factor that, as a consequence of a particular regulation, detrimentally affects the precision of any corrected-graduation dial.

SUMMARY OF THE INVENTION

In view of the above, the need has been felt to study different transmission means for movements of pressure gages, such as to ensure a perfect calibration and an absolutely invariable transmission ratio for the means connecting the closed end of said spring tube to the members of the indicator device.

The device according to the present invention is the result of said study and perfectly complies with the requirements and yet is of very simple construction. In effect, the problem has been solved by using, in lieu of a usual link with displaceable pivot, a small variable-diameter constantly centered pulley working together with a small transmission chain or other means having similar characteristics. It will be apparent from the following description that the system according to the invention ensures an absolutely invariable transmission ratio and perfect calibration characteristics, so as to enable the industrial mass-production of gages giving high-precision indications over the entire graduated scale, regardless of any particular position of calibration.

BRIEF DESCRIPTION OF THE DRAWING

The accompanying drawing shows, as a non-limiting example, a preferred embodiment of the device according to the invention.

In the drawing.

DESCRIPTION OF THE PREFERRED EMBODIMENT

Figure 1:
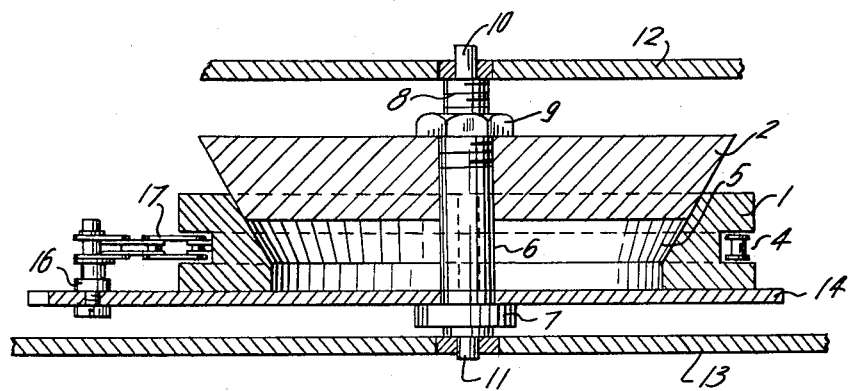
FIG. 1 is an axial sectional view through line A—A of FIG. 2 and at a greater scale of the variable-diameter pulley member forming the basic member of the invention.
Figure 2:
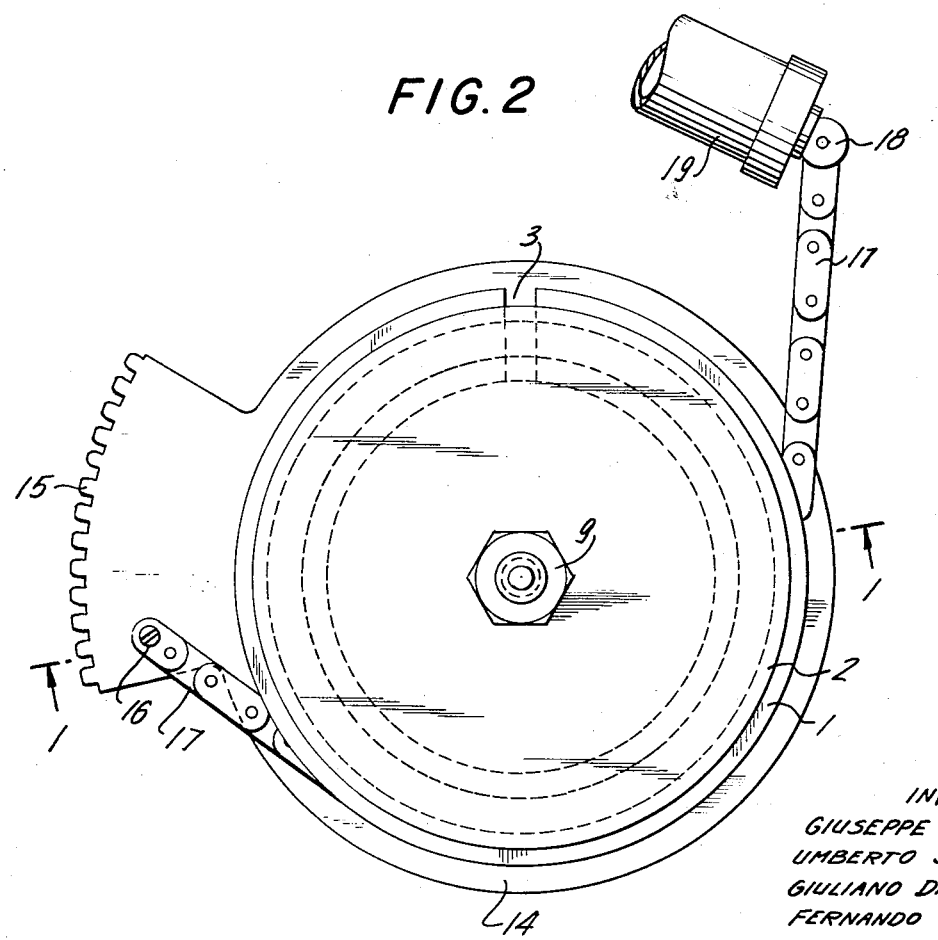
FIG. 2 is a plan view of FIG. 1, also showing the transmission chain forming a complementary member of the device according to the invention.

The calibration device according to the invention, as clearly appearing from the figures showing a basic and preferred embodiment, substantially comprises a small variable-diameter pulley which is formed by an expansible rim 1 and an expander disc 2. The rim 1 is radially cut at 3 so as to enable the expansion thereof and is provided on its outer face with a circular groove 4, whereas its inner face is frusto-conical, so as to form a centering seat 5 exactly mating with the expander disc 2 which to this purpose has a frusto-conical peripheral face.

Said members 1 and 2 are held together by a small shaft 6 having a shoulder 7 at the bottom thereof and having at the top thereof a threaded shank adapted to receive an assembling and regulating nut 9 screwed thereon. The two ends 10 and 11 of shaft 6 are of suitably reduced diameter and/or tapered so that they can be rotatably mounted on clockwork jewels blocked in the plates 12 and 13 forming the frame of the device, which frame is only shown fragmentarily and diagrammatically.

The undersurface of the rim 1 is supported on the plate 14; the latter has a lateral projection in the form of a toothed sector 15 (shown diagrammatically and in a not real position) for actuating the pinion on the pivot of the indicator pointer of the instrument, these latter members being known and not shown for sake of simplicity. The plate 14 is supported on the shoulder 7 of shaft 6 and is frictionally driven by the rim 1 which is pressed thereagainst by nut 9 through the expander disc 2.

Fixed on the projection of the plate 14 is a pivot 16 to which is pivotably connected the end of a transmission chain 17 (or of any other flexible but not extensible means such as a steel wire cable). Said chain 17 is received in the circular groove 4 around a given sector of said pulley and its other end is fixed to a connecting ring 18 on the closed end of the spring Bourdon tube 19, diagrammatically shown in an illustrative position. The assembly is complemented by any return-spring, such as a coil spring (not shown) which is very sensitive and, therefore, suitable to hold the members in a correct position.

The operation of the pulley according to the invention and its transmission system between the same and the closed moving end of the spring tube 19 is apparent. In order to effect the calibration, it is only necessary to change the diameter of the pulley, i.e. of the rim 1, by suitably regulating the nut 9, which can be carried out without changing the transmission ratio between the end of the tube 19 and the toothed sector 15, the transmission being effected by the constant-length chain 17. Moreover, the system ensures uniform transmission conditions regardless of the calibration conditions of the device according to the invention, whereby the pressure readings will be exact at all times over the entire range of the graduated scale of the instrument, which is the object of the invention.

Obviously, the expansion of the pulley can also be effected by any other suitable system provided the latter is capable of ensuring the perfectly centered position of said pulley at all times. Other changes and improvements can be made within the scope of the invention, the basic principle of which is the use of a variable-diameter pulley and a flexible non-extensible member, such as a chain, as transmission and calibration members for constructing high-precision movements for pressure gages and other similar instruments.

We claim:

1. An arrangement for calibrating a Bourdon tube gage comprising, in combination, a regulatable variable diameter pulley having a radial gap, the variation in said gap varying the diameter of said pulley; an elongated flexible member of constant length and in contact with the rim of said pulley and having one end connected to said Bourdon tube, said rim having a frusto-conical inner seat; an indicating gage connected to the other end of said flexible member; and a disc member having a frusto-conical outer face for mating with said frusto-conical inner seat on said rim for expanding said rim and thereby said diameter.

2. The arrangement as defined in claim 1, including a central shaft through said disc member and said pulley for pressing said disc member against said pulley, said central shaft having a shoulder; a base plate supported by said shoulder; a threaded shank portion on said shaft; a regulating threaded nut on said threaded shank portion of said shaft for pressing said disc member against said pulley and varying thereby the diameter of said rim supported on said base plate.

3. The arrangement as defined in claim 1, including a geared sector on said gage and connected to said other end of said flexible member; and a geared pinion in mesh with said sector and rotated by said sector for indicating the displacement of said Bourdon tube.

4. The arrangement as defined in claim 2, including clockwork dual pipe bearings in said plate for rotatably holding the ends of said central shaft, said ends of said central shaft being of reduced diameter.

5. The arrangement as defined in claim 3, including an indicating pointer linked to said pinion and positioned by said pinion, said pulley having a substantially constant centered position with variations in said gap.

* * * * *

UNITED STATES PATENT OFFICE
CERTIFICATE OF CORRECTION

Patent No. 3,707,089          Dated   December 26, 1972

Inventor(s)   Giuseppe Stradella; Umberto Stradella; Giuliano Daniele

It is certified that error appears in the above-identified patent and that said Letters Patent are hereby corrected as shown below:

In the heading, the foreign application priority data should read -- December 6, 1969   Italy 7497A/69 --

Signed and sealed this 29th day of May 1973.

(SEAL)
Attest:

EDWARD M. FLETCHER, JR.                ROBERT GOTTSCHALK
Attesting Officer                      Commissioner of Patents